United States Patent

Bandai et al.

[11] Patent Number: 6,081,145
[45] Date of Patent: Jun. 27, 2000

[54] SEMICONDUCTOR INTEGRATED CIRCUIT DEVICE

[75] Inventors: Ryouichi Bandai; Kenji Sakaue, both of Yokohama; Keiko Fukuda, Sumida-ku, all of Japan

[73] Assignee: Kabushiki Kaisha Toshiba, Kanagawa-Ken, Japan

[21] Appl. No.: 09/096,104

[22] Filed: Jun. 11, 1998

[30] Foreign Application Priority Data

Jun. 13, 1997 [JP] Japan ..................................... 9-156353
Apr. 2, 1998 [JP] Japan ..................................... 10-090176

[51] Int. Cl.⁷ ....................................................... H03K 3/00
[52] U.S. Cl. ............................................ 327/231; 327/233
[58] Field of Search ..................................... 327/231–235, 327/236, 237, 147, 149, 150, 155, 156, 158, 159

[56] References Cited

U.S. PATENT DOCUMENTS

| | | | |
|---|---|---|---|
| 5,122,679 | 6/1992 | Ishii et al. | 327/149 |
| 5,278,814 | 1/1994 | Deguchi et al. | 369/47 |
| 5,420,544 | 5/1995 | Ishibashi | 327/156 |
| 5,568,097 | 10/1996 | Woodman, Jr. | 327/147 |

*Primary Examiner*—Timothy P. Callahan
*Assistant Examiner*—An T. Luu
*Attorney, Agent, or Firm*—Hogan & Hartson LLP

[57] ABSTRACT

A semiconductor integrated circuit device has a plurality of functional blocks. Each of the plurality of functional blocks comprises a DLL circuit for outputting a clock signal, at least one wiring portion for receiving the clock signal at one end thereof, and at least one load circuit for receiving the clock signal from the DLL circuit via the wiring portion. The DLL circuit receives a reference clock signal and a wiring portion and outputs the clock signal so that the phase difference between the reference clock signal and the second clock signal is a predetermined value. Thus, clock skew is reduced even if there is variation due to process.

15 Claims, 12 Drawing Sheets

(ADJUSTMENT OF LEADING EDGES)

SEMICONDUCTOR INTEGRATED CIRCUIT DEVICE

BACKGROUND OF THE INVENTION

1. Field of the Invention

The present invention relates to a semiconductor integrated circuit device.

2. Description of the Related Art

In recent years, semiconductor integrated circuit devices have been large-scale integrated, so that it has been important to distribute a clock to each of functional blocks and so forth, which form a semiconductor integrated circuit, by an appropriate delay time.

FIG. 7 shows an example of a conventional semiconductor integrated circuit device, which distributes a clock to each of functional blocks so that delay times are equal to each other. In FIG. 7, functional blocks $61i$ including load circuits $76i$ (i=a, b, c, d) are arranged by means of a circuit simulator so that a tree structure is formed and delay times are equal to each other at the terminal nodes (leafs) of the respective functional blocks. In order to amplify weakened clock signals f, buffers 71, 72, 73a, 73b, 74a through 74d, 75a through 75d, and 76a through 76d are provided at the respective nodes.

Also as shown in FIG. 8, a short-circuit is established between the terminal nodes of the respective functional blocks $61i$ (i=a, b, c, d) in the conventional semiconductor integrated circuit device shown in FIG. 7 to reduce the phase differences between the clock signals at the terminal nodes of the respective functional blocks $61i$.

However, in the aforementioned conventional semiconductor integrated circuit device, there is a problem in that the phase differences between the clock signals occur at the input ends of the respective functional blocks due to the variation in manufacturing process and so forth even if delay times are suitably distributed when the device is designed. Although the circuit simulation may be performed in the design stage in view of the phase differences caused by the variation in manufacturing process and so forth, it takes very much time, so that this is not efficient.

SUMMARY OF THE INVENTION

It is therefore an object of the present invention to eliminate the aforementioned problems and to provide a semiconductor integrated circuit device, which can prevent clock skew from occurring even if there are the variation due to process and so forth.

In order to accomplish the aforementioned and other objects, according to one aspect of the present invention, a semiconductor integrated circuit device comprises: a plurality of functional blocks, each comprising: a DLL circuit for outputting a first clock signal; at least one wiring portion, one end of which is connected to an output end of the DLL circuit for allowing the first clock signal to pass therethrough; and at least one load circuit for receiving the first clock signal from the DLL circuit via the wiring portion, wherein the DLL circuit outputs the first clock signal so that a phase difference between a reference clock signal and a second clock signal outputted from the other end of the wiring portion is a predetermined value.

At least one functional block of the plurality of functional blocks may have a plurality of wiring portions, each of which is the wiring portion, each of the wiring portions being provided with at least one load circuit corresponding to each of the wiring portions, one end of each of the plurality of wiring portions being short-circuited to receive an output of the DLL circuit, and the other end of each of the plurality of wiring portions being short-circuited to be connected to an input end of the DLL circuit, to which the second clock signal is inputted.

The other end of each of the plurality of functional blocks may be short-circuited, and the semiconductor integrated circuit device may further comprise a PLL circuit for producing the reference clock signal on the basis of the second clock signal transmitted from the short-circuit end and a clock signal transmitted from the outside, to transmit the reference clock signal to the DLL circuit of each of the plurality of functional blocks.

The DLL circuit may comprise: a delay circuit for producing a plurality of delay signals, which have different lags from the reference clock signal, on the basis of the reference clock signal; a phase comparator circuit for comparing a phase of the reference clock signal with a phase of the second clock signal transmitted from the other end of the wiring portion, to output a control signal for causing a phase difference of a predetermined value; and means for selecting one delay signal from the plurality of delay signals on the basis of the control signal to output the selected delay signal to the wiring portion.

The delay circuit may have a series circuit comprising a plurality of serially-connected delay elements.

The delay circuit may have a plurality of series circuits, each of which comprises a plurality of serially-connected delay elements, the plurality of series circuits being connected to each other in parallel, each of the plurality of series circuits having different lags.

According to another aspect of the present invention, a semiconductor integrated circuit device comprises: a plurality of functional blocks, each comprising: a DLL circuit for receiving a reference clock signal and at least one shift clock signal phase-shifted from the reference clock signal, to output a first clock signal; at least one wiring portion, one end of which is connected to an output end of the DLL circuit for allowing the first clock signal to pass therethrough; and at least one load circuit for receiving the first clock signal from the DLL circuit via the wiring portion, wherein the DLL circuit outputs the first clock signal so that a phase difference between a reference clock signal and a second clock signal outputted from the other end of the wiring portion is a predetermined value.

At least one functional block of the plurality of functional blocks may have a plurality of wiring portions, each of which is the wiring portion, each of the wiring portions being provided with at least one load circuit corresponding to each of the wiring portions, one end of each of the plurality of wiring portions being short-circuited to receive an output of the DLL circuit, and the other end of each of the plurality of wiring portions being short-circuited to be connected to an input end of the DLL circuit, to which the second clock signal is inputted.

The semiconductor integrated circuit may further comprise a PLL circuit for producing the reference clock signal and the shift clock signal on the basis of a clock signal transmitted from the outside, to transmit the reference clock signal and the shift clock signal to the DLL circuit of each of the plurality of functional blocks.

The shift clock signal may be a first shift clock signal delayed from the reference clock signal by a phase of 90 degrees, and the DLL circuit may comprise: shift clock producing means for producing a second shift clock signal delayed from the reference clock signal by a phase of 180 degree and a third shift clock signal delayed from the first shift clock signal by a phase of 180 degree, on the basis of the reference clock signal and the first shift clock signal; a selecting circuit for selecting one clock signal from the reference clock signal and the first through third shift clock signals on the basis of a command signal, to output the selected clock signal; a phase comparator circuit for comparing a phase of a second clock signal outputted from the other end of the wiring portion with a phase of the reference clock signal, to detect a phase lag of the second clock signal from the reference clock signal to transmit the command signal to the selecting circuit on the basis of the phase lag; and a delay circuit for applying a lag, which corresponds to the phase lag detected by the phase comparator circuit, to the clock signal outputted from the selecting circuit and for outputting the resulting clock signal to the wiring portion.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Figure 1:
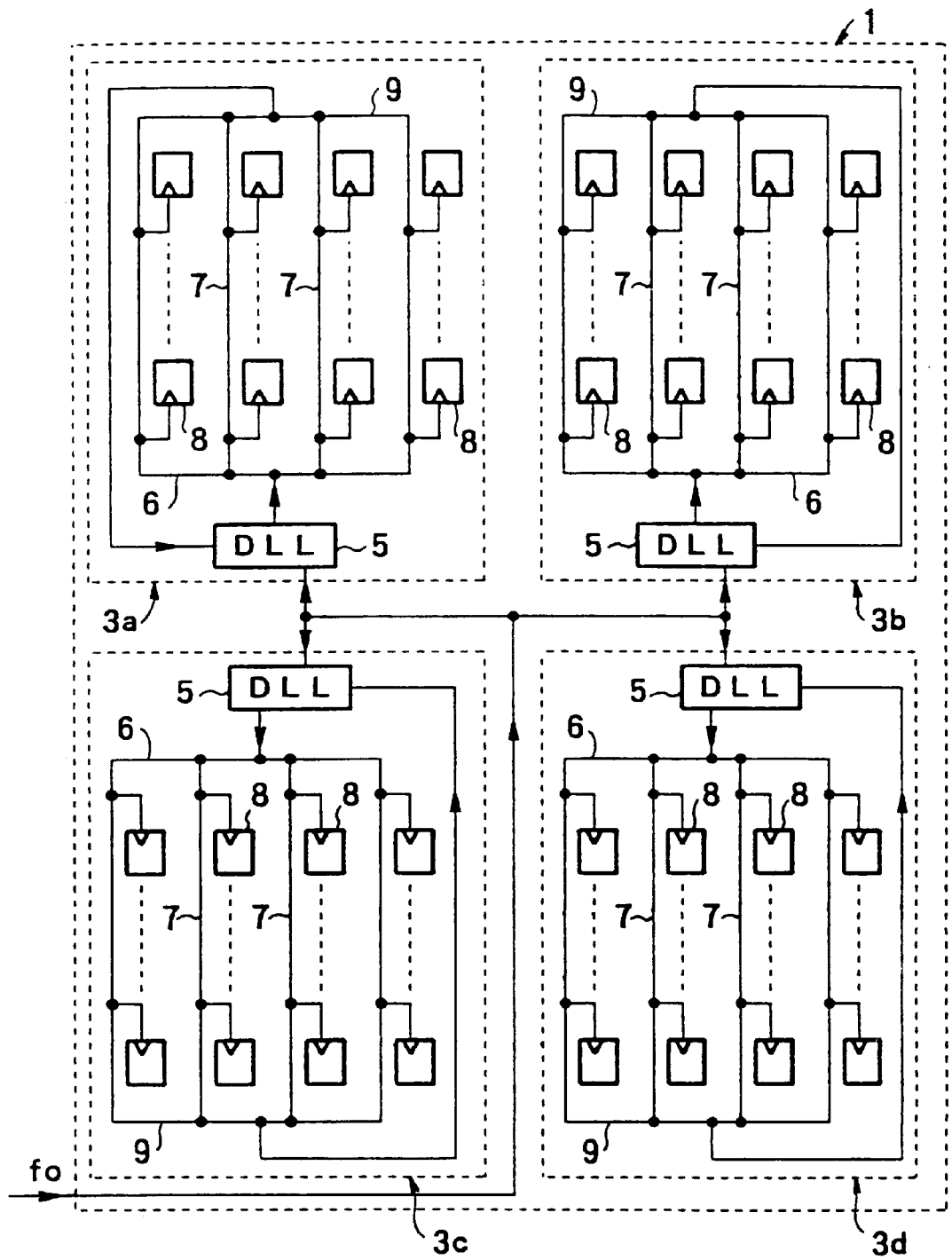
FIG. 1 is a block diagram of the first preferred embodiment of a semiconductor integrated circuit device according to the present invention.

Referring now to the accompanying drawings, particularly to FIG. 1, the first preferred embodiment of a semiconductor integrated circuit device according to the present invention will be described below.

In this preferred embodiment, a semiconductor integrated circuit device 1 has a plurality of functional blocks 3a, 3b, 3c and 3d. Each of the functional blocks 3i (i=a, b, c, d) comprises a DLL (Delay Locked Loops) circuit 5, a clock input end portion 6, a tree portion 7, a load circuit 8 (e.g., a shift register 8 comprising flip-flops), and a clock output end portion 9.

A clock signal $f_0$ (also hereinafter referred to as a reference clock $f_0$), which is transmitted from the outside of the semiconductor integrated circuit device 1, is inputted to the DLL circuit 5 of each of the functional blocks 3i (i=a, b, c, d). The DLL circuit 5 of each of the functional blocks receives the reference clock $f_0$ and a clock signal transmitted from the clock output end portion 9, and produces a clock signal delayed from the reference clock $f_0$ by a predetermined delay time (corresponding to one cycle or a half cycle of the reference clock $f_0$) to transmit the delayed clock signal to the clock input end portion 6.

The clock signal transmitted to the clock input end portion 6 is divided to be transmitted to the tree portion 7, and transmitted from the tree portion 7 to the load circuit 8. Then, the clock signal returns to the DLL circuit 5 via the clock output end portion 9, which is the termination of the tree portion 7.

Figure 2:
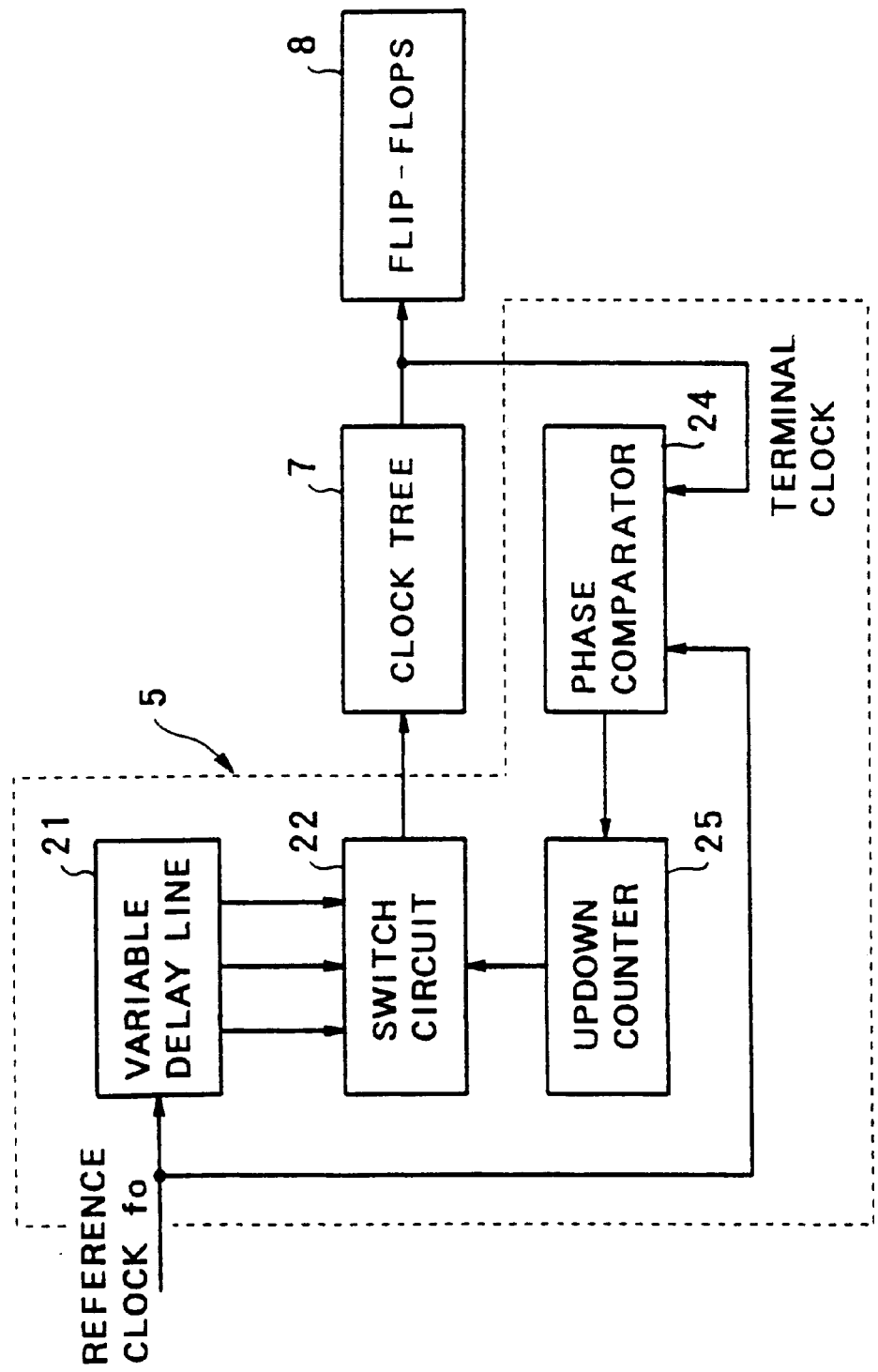
FIG. 2 is a block diagram for explaining the detailed construction of a DLL circuit according to the present invention.
Figure 4A:
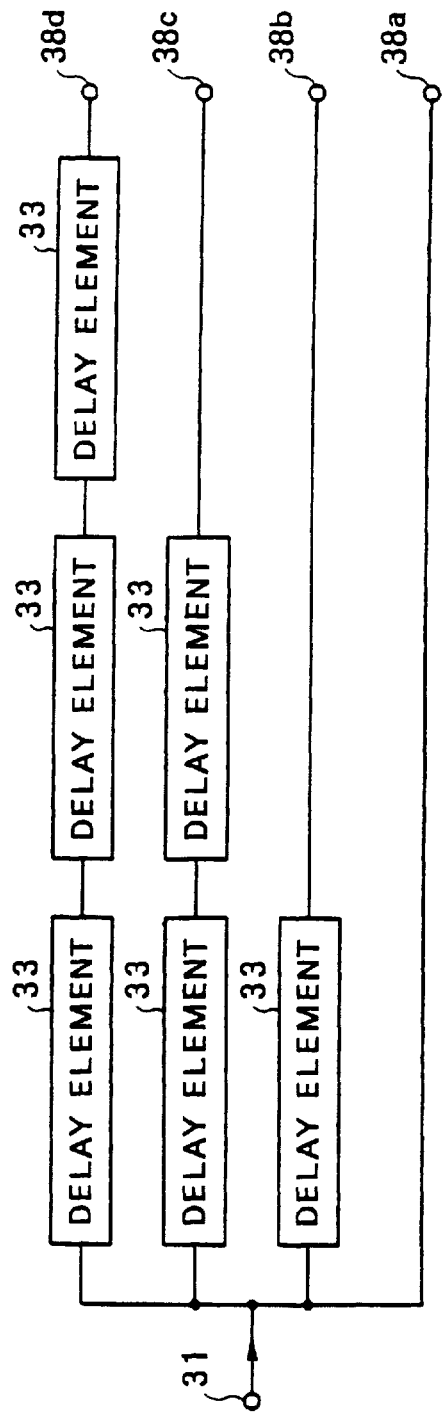
FIGS. 4A and 4B are circuit diagrams of examples of variable delay lines of the DLL circuit of FIG. 2.

As shown in FIG. 2, the DLL circuit 5 comprises a variable delay line 21, a switch circuit 22, a phase comparator 24 and an updown counter 25. The variable delay line 21 receives a reference clock $f_0$, and outputs the reference clock $f_0$ and clock signals, which are delayed from the reference clock $f_0$ by delay times corresponding to one delay element, two delay elements, three delay elements, . . . , and n delay elements. Specifically as shown in FIG. 4A, the variable delay line 21 comprises a first series circuit of a delay element 33 of, e.g., an inverter, a second series circuit of two delay elements 33 connected in series, a third series circuit of three delay elements 33 connected in series, and so forth. The reference clock $f_0$ is inputted to an input end 31, and outputted from an output end 38a. A clock signal delayed by a delay time corresponding to a delay element is outputted from an output end 38b of the first series circuit. A clock signal delayed by a delay time corresponding to two delay elements is outputted from an output end 38c of the second series circuit. A clock signal delayed by a delay time corresponding to three delay elements is outputted from an output end 38d of the third series circuit.

Figure 4B:
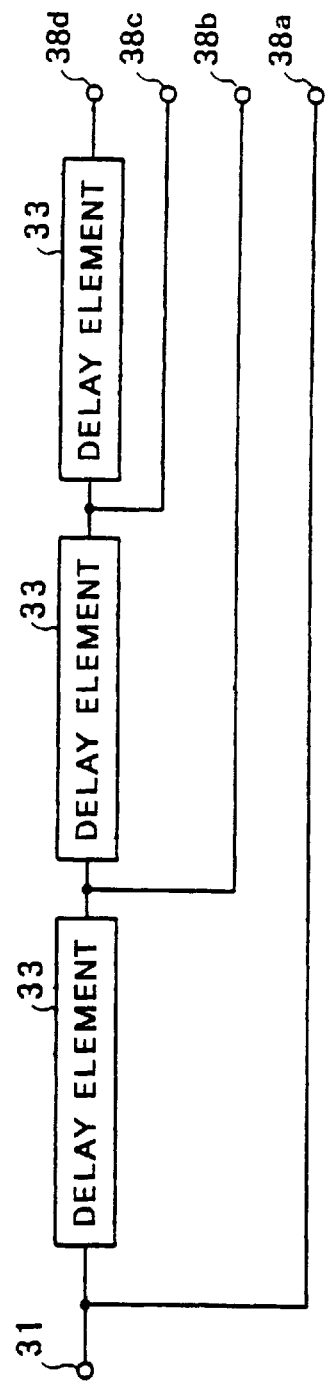

Alternatively, as shown in FIG. 4B, a plurality of delay elements 33 may be connected in series to output clock signals from the output ends of the respective stages of the delay elements 33.

Referring to FIG. 2 again, the phase comparator 24 compares the phase of the reference clock $f_0$ with the phase of a terminal clock transmitted from the end of the clock tree 7, and transmits a control signal, which allows the phase difference between the terminal clock and the reference clock $f_0$ to be a predetermined value (e.g., one cycle of the reference clock $f_0$), to the updown counter 25. Then, on the basis of the control signal, the updown counter 25 increase or decrease the counted value by 1 to transmit the counted value to the switch circuit 22. When the phase difference is zero, the updown counter 25 does not change the counted value.

The switch circuit 22 selects one of the output ends of the variable delay line 21 on the basis of the counted value of the updown counter 25, and transmits a clock signal outputted from the selected output end to the clock tree 7. For example, when the counted value is increased by 1, the output end of the variable delay line 21 is selected so that the phase difference increases by one delay element, and when the counted value is decreased by 1, the output end of the variable delay line 21 is selected so that the phase difference decreases by one delay element.

Figure 3A:
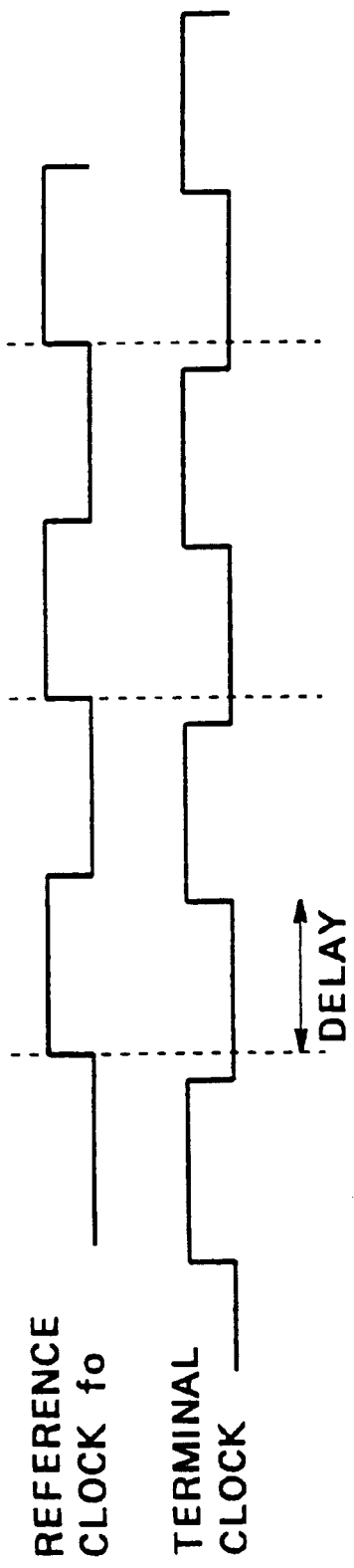
FIGS. 3A and 3B are waveform charts illustrating the operation of the DLL circuit of FIG. 2.
Figure 3B:
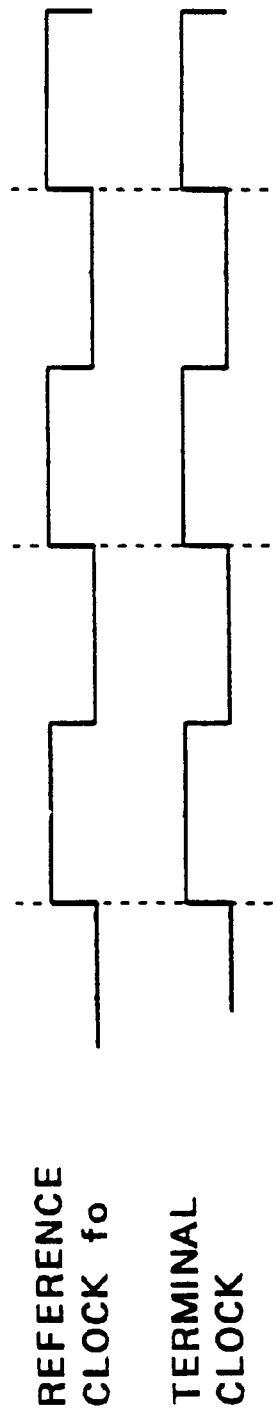

With this construction of the DLL circuit 5, when there is a delay (a phase difference) between the reference clock $f_0$ and the terminal clock as shown in FIG. 3A, the DLL circuit 5 adjusts the terminal clock so that the leading edges of the terminal clock and the reference clock $f_0$ are coincident with each other as shown in FIG. 3B, i.e., so that the terminal clock is delayed from the reference clock $f_0$ by one cycle of the reference clock $f_0$.

As described above, according to the semiconductor integrated circuit device in the first preferred embodiment, each of the functional blocks $3i$ (i=a, b, c, d) is provided with the DLL circuit 5, so that it is possible to remove the phase difference between the reference clock $f_0$ and the terminal clock, which are inputted to the respective functional blocks $3i$ (i=a, b, c, d). Thus, it is possible to prevent clock skew from occurring even if there are variation in process and so forth.

Figure 5:
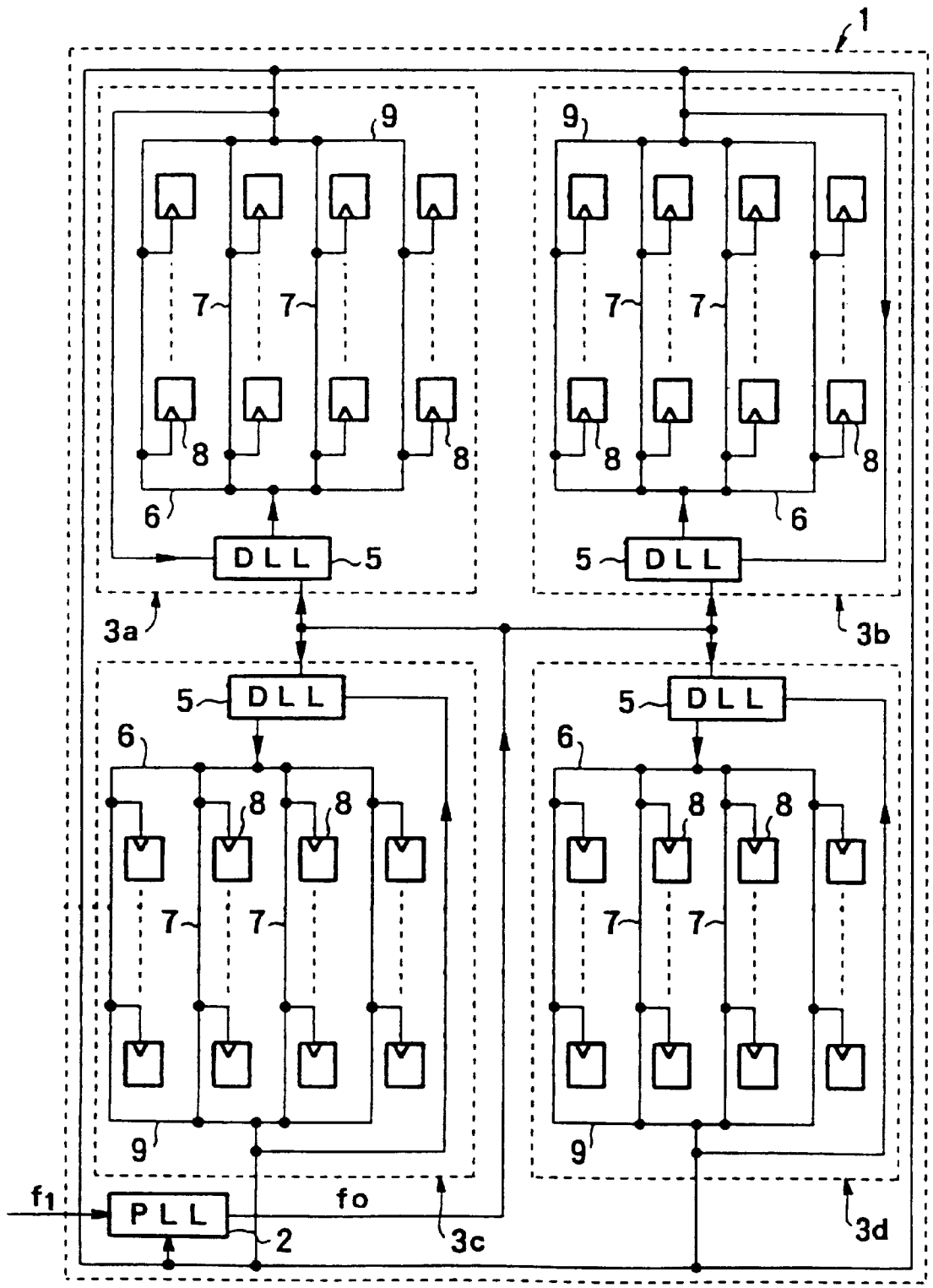
FIG. 5 is a block diagram of the second preferred embodiment of a semiconductor integrated circuit device according to the present invention.

Referring to FIG. 5, the second preferred embodiment of a semiconductor integrated circuit device according to the present invention will be described below.

In this preferred embodiment, a semiconductor integrated circuit device is provided with a PLL circuit 2 in addition to the same construction as that of the semiconductor integrated circuit device in the first preferred embodiment shown in FIG. 1. The PLL circuit 2 produces a reference clock signal $f_0$ on the basis of a clock signal $f_1$ transmitted from the outside and a clock signal transmitted from a short-circuit end wherein a short-circuit is established between the ends of functional blocks $3a$, $3b$, $3c$ and $3d$, and adjusts the clock signal so that the phase difference between the reference clock signal $f_0$ and the clock signal transmitted from the short-circuit end is zero. When n is a positive integer, the frequency of the reference clock signal $f_0$ is n times or 1/n times as large as the frequency of the clock signal $f_1$. Similar to the first preferred embodiment, the reference clock $f_0$ is inputted to the DLL circuit 5 of each of the functional blocks $3i$ (i=a, b, c, d).

With this construction, it is possible to correct the phase difference between the respective functional blocks $3i$ (i=a, b, c, d). The second preferred embodiment has the same advantages as those of the first preferred embodiment.

Figure 6:
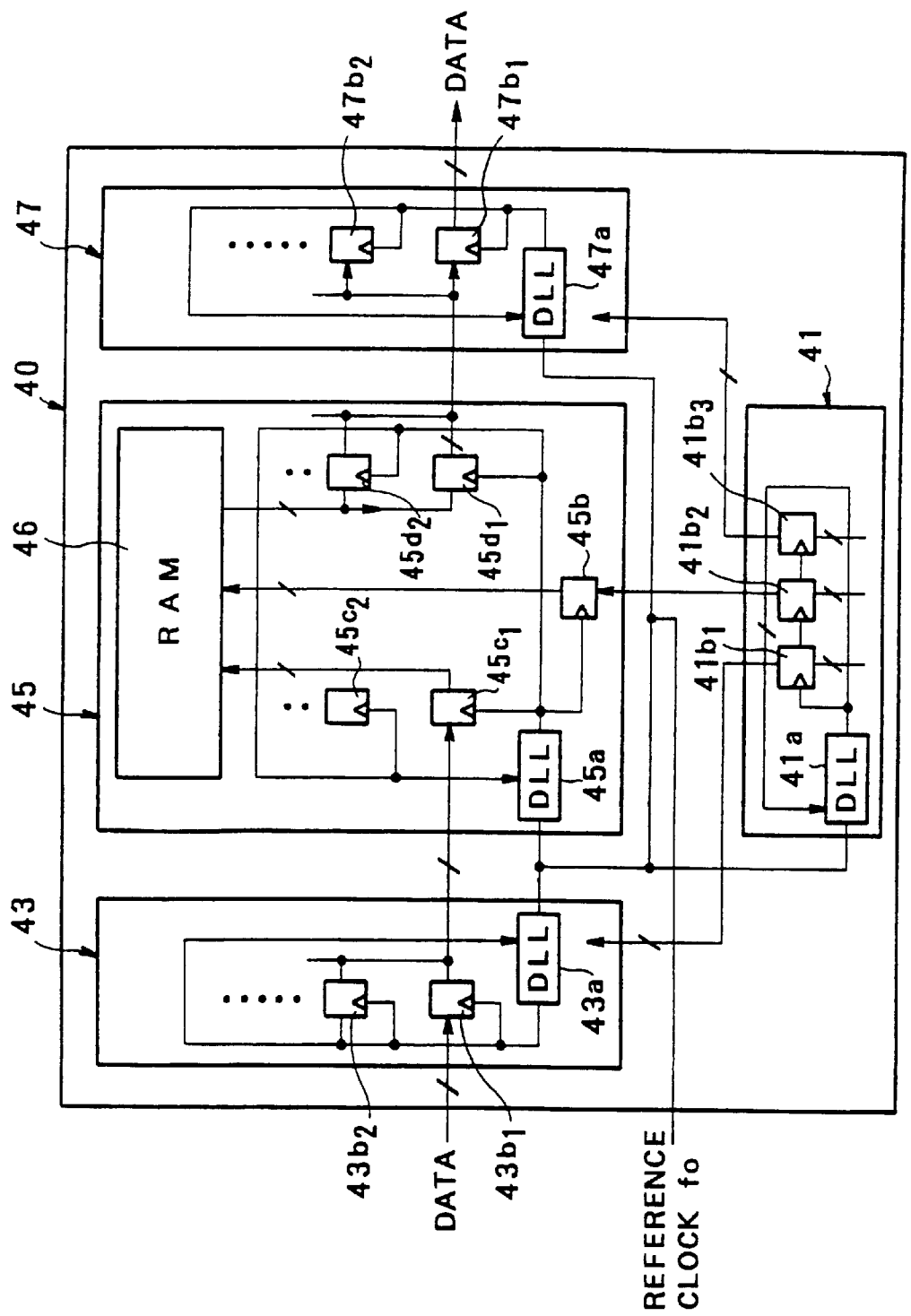
FIG. 6 is a block diagram of the third preferred embodiment of a semiconductor integrated circuit device according to the present invention.
Figure 7:
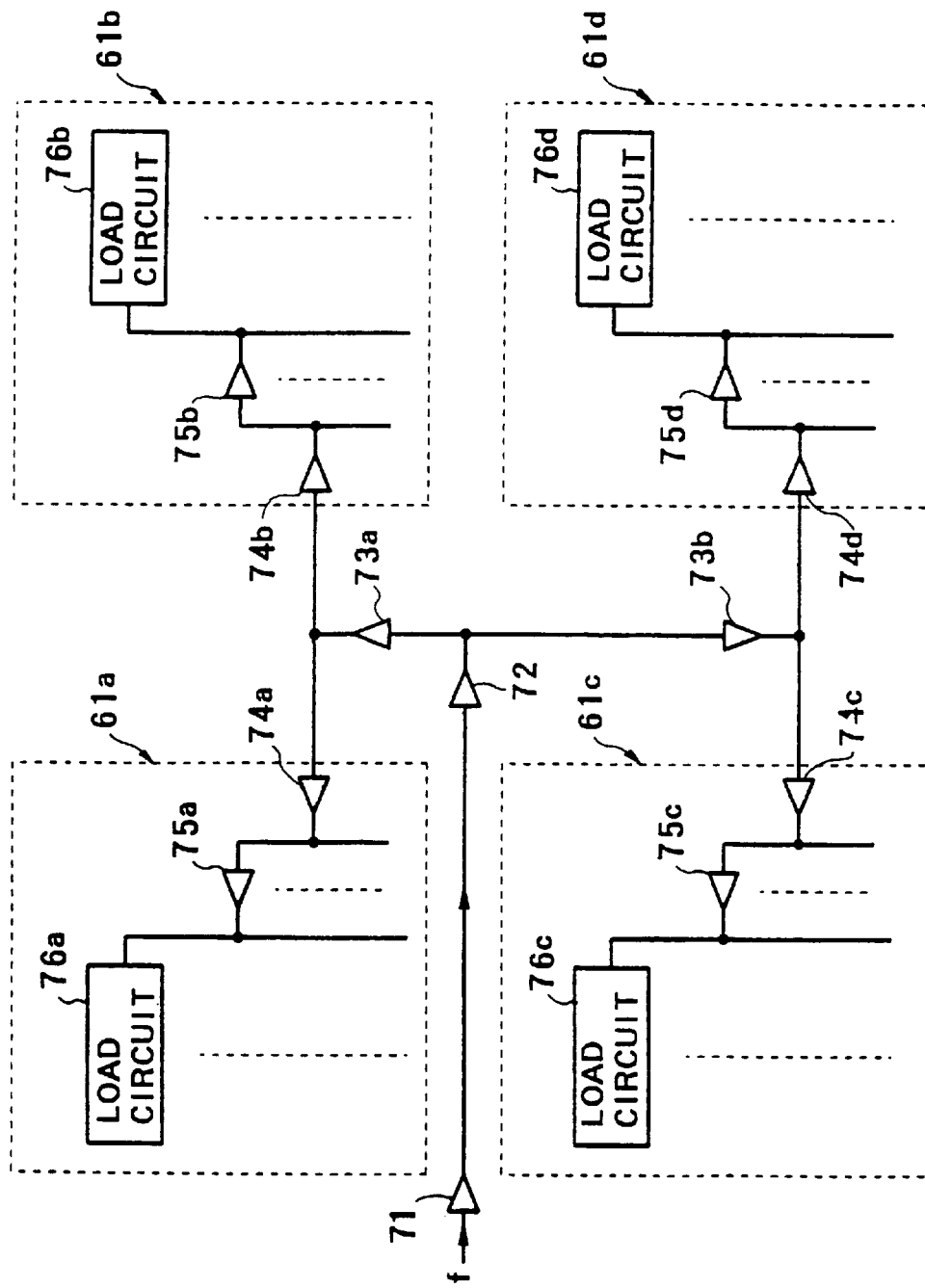
FIG. 7 is a block diagram of a conventional semiconductor integrated circuit device.
Figure 8:
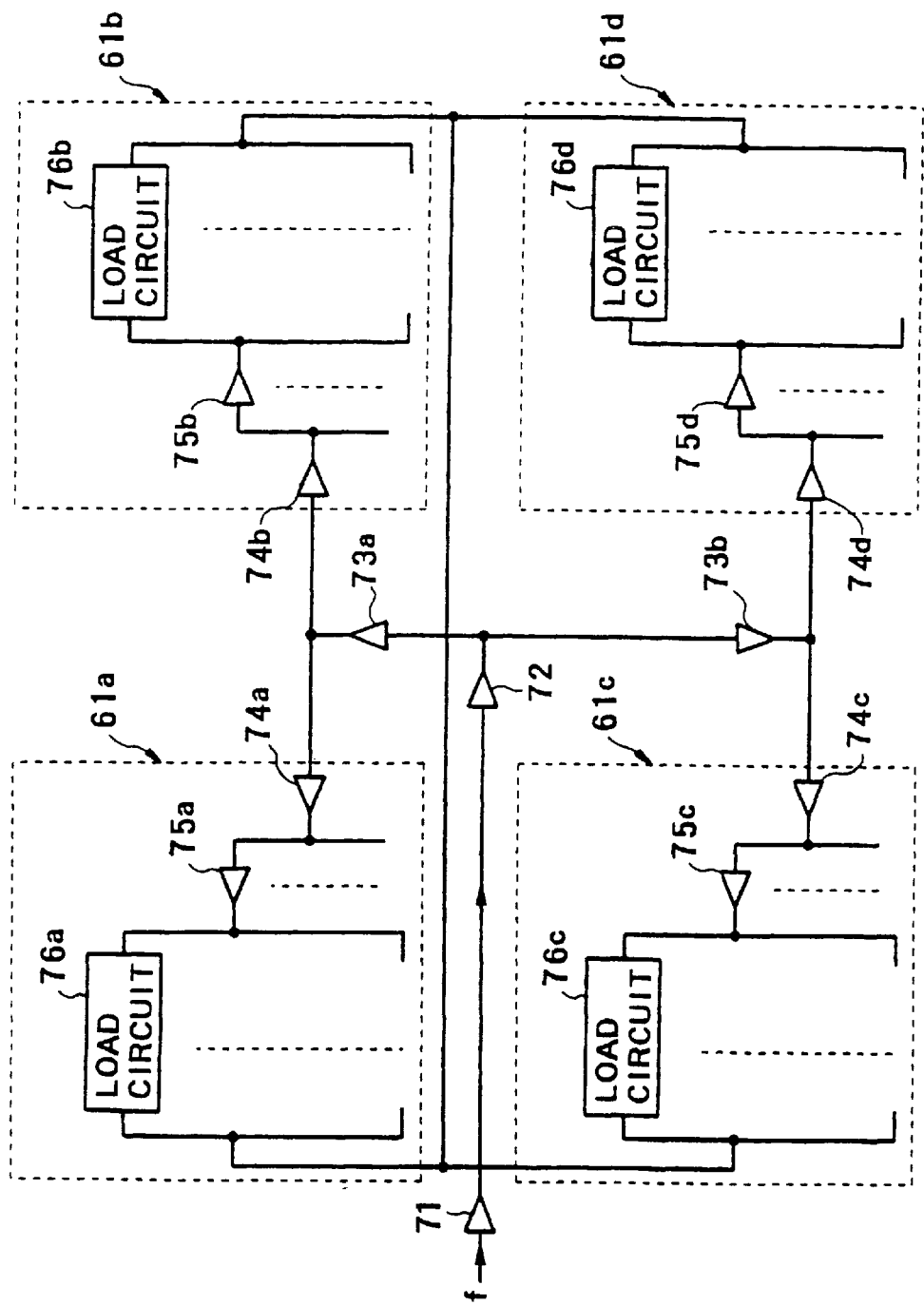
FIG. 8 is a block diagram of another conventional semiconductor integrated circuit device.

Referring to FIG. 6, the third preferred embodiment of a semiconductor integrated circuit device according to the present invention will be described below.

In this preferred embodiment, a semiconductor integrated circuit device 40 comprises a control block 41, an input block 43, a memory block 45 and an output block 47.

The control block 41 has a DLL circuit 41a and flip-flops $41b_2$, $41b_2$ and $41b_3$. The input block 43 has a DLL circuit 43a, and a shift register comprising flip-flops $43b_1$, $43b_2$, . . . . The memory block 45 has a DLL circuit 45a, a flip-flop 45b, flip-flops $45c_1$, $45c_2$, . . . , and flip-flops $45d_1$, $45d_2$, . . . , and a RAM (Random Access Memory) 46. The output block 47 has a DLL circuit 47a, and a shift register comprising flip-flops $47b_1$, $47b_2$, . . . .

The construction and operation of the semiconductor integrated circuit device in this preferred embodiment will be described below.

First, a reference clock $f_0$ transmitted from the outside is inputted to each of the DLL circuits 41a, 43a, 45a and 47a of the respective blocks. Then, a clock signal delayed from the reference clock $f_0$ by one cycle of the reference clock $f_0$, i.e., a clock signal having no phase difference from the reference clock $f_0$, is outputted from each of the DLL circuits.

After the flip-flop $41b_1$ in the control block 41 receives the clock signal, a command signal for starting the serial-parallel conversion is transmitted from the flip-flop $41b_1$ to the input block 43 after a predetermined timing. Then, the shift register of the input block 43 starts to operate to receive and convert data, which are serially transmitted from the outside, to parallel data on the basis of the clock signal transmitted from the DLL circuit 43a.

After the serial-parallel conversion is completed, an enable signal is transmitted from the flip-flop $41b_2$ to the memory block 45. Then, the data stored in the flip-flops $43b_1$, $43b_2$, . . . forming the shift resistor of the input block 43 are received by the corresponding flip-flops $45c_1$, $45c_2$, . . . of the memory block 45 on the basis of the output of the DLL circuit 43a. At this time, a writing enable signal is transmitted from the flip-flop $41b_2$ of the control block 41 to the RAM 46 via the flip-flop 45b, and an address signal in the RAM 46, in which the received data are to be stored, is transmitted to the RAM 46 via the flip-flop 45b. The received data are transmitted from the flip-flops $45c_1$, $45c_2$, . . . to the RAM 46 on the basis of the clock signal transmitted from the DLL circuit 45a and stored therein.

Thereafter, when a readout enable signal and an address signal are transmitted from the flip-flop of the control block 41 to the RAM 46 via the flip-flop 45b of the memory block 45, data are read out of the RAM 46 to be stored in the flip-flops $45d_1$, $45d_2$, . . . .

Then, when a parallel-serial conversion starting command is transmitted from the flip-flop $43b_3$ of the control block 41 to the output block 47, the data stored in the flip-flops $45d_1$, $45d_2$, . . . of the memory block 45 are transmitted to the corresponding flip-flops $47d_1$, $47d_2$, . . . forming the shift register of the output block 47, on the basis of the clock signal, which is the output of the DLL circuit 47a, and data are serially outputted from the shift register to the outside.

As described above, according to this third preferred embodiment, since each of the functional blocks has the DLL circuit, it is possible to prevent clock skew from occurring even if there are variation due to process and so forth.

In the semiconductor integrated circuit devices of the first through third preferred embodiments, each of the functional blocks has the DLL circuit 5. The DLL circuit 5 has the variable delay line as shown in, e.g., FIG. 2. In general, since the area occupied by the variable delay line is great, the area occupied by the DLL circuit 5 is great, so that there is a problem in that the chip size increases. This problem can be eliminated by the fourth preferred embodiment of a semiconductor integrated circuit device according to the present invention, which will be described below.

Figure 9:
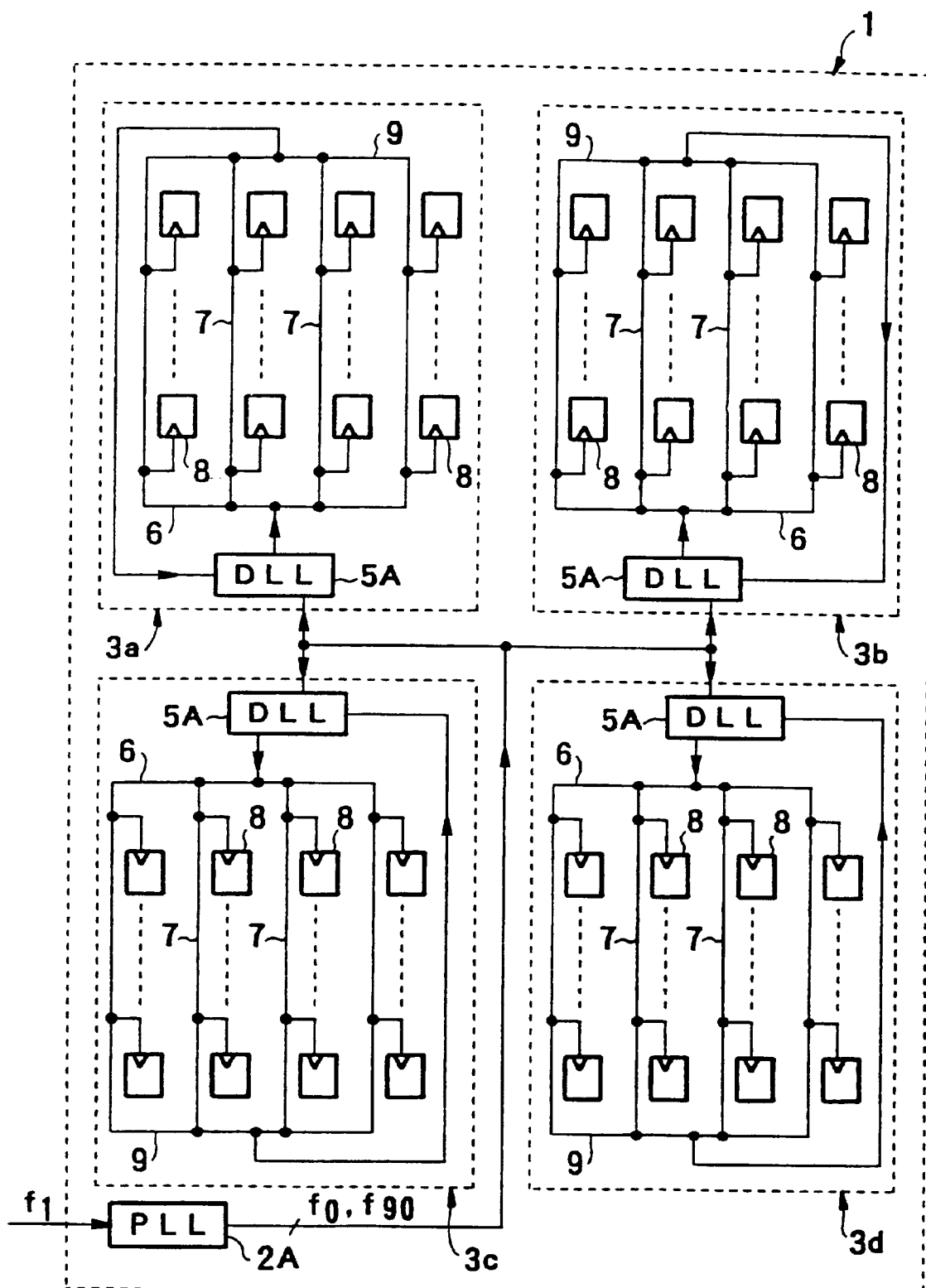
FIG. 9 is a block diagram of the fourth preferred embodiment of a semiconductor integrated circuit device according to the present invention.
Figure 10:
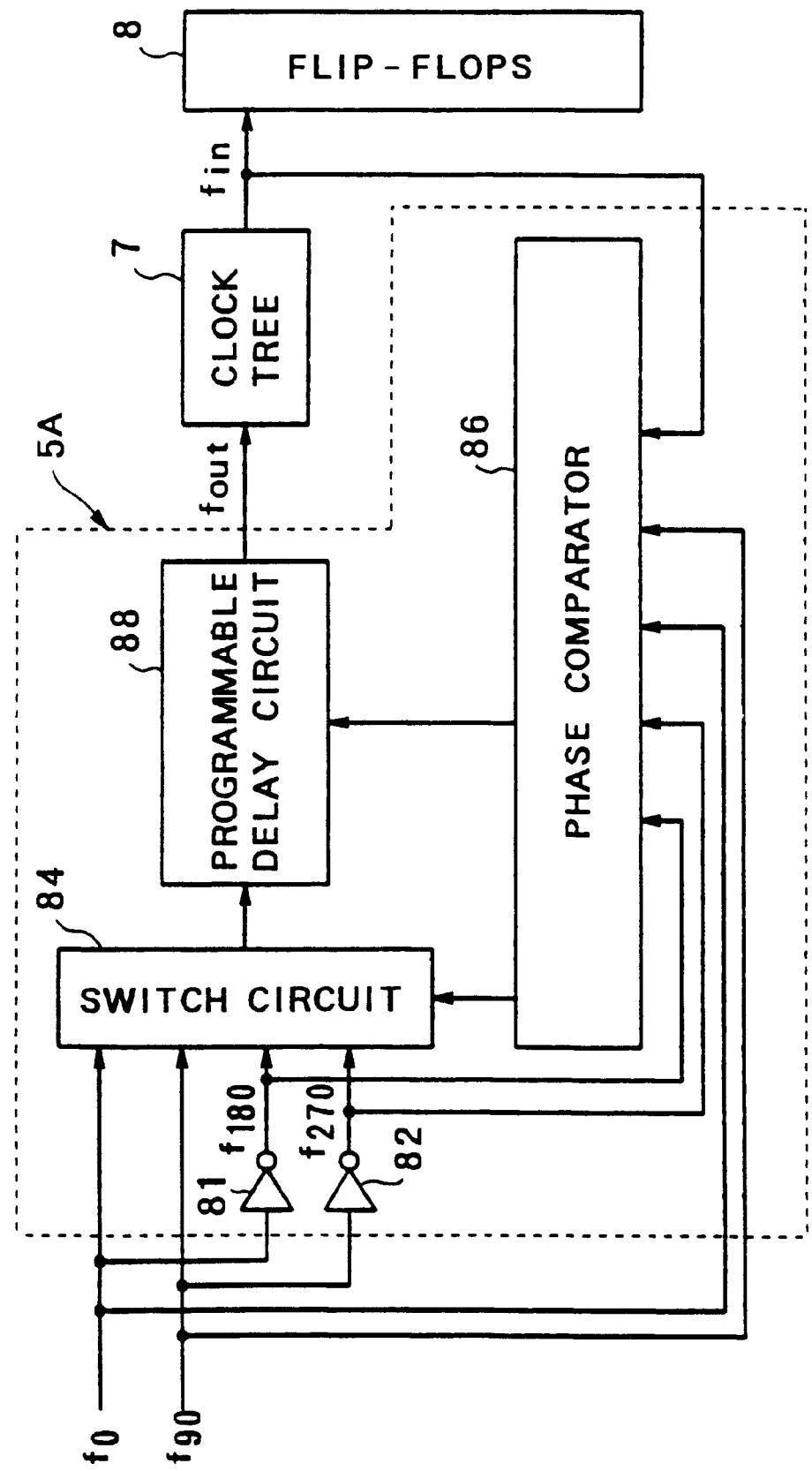
FIG. 10 is a block diagram illustrating the detailed construction of a DLL circuit for use in the fourth preferred embodiment.
Figure 11:
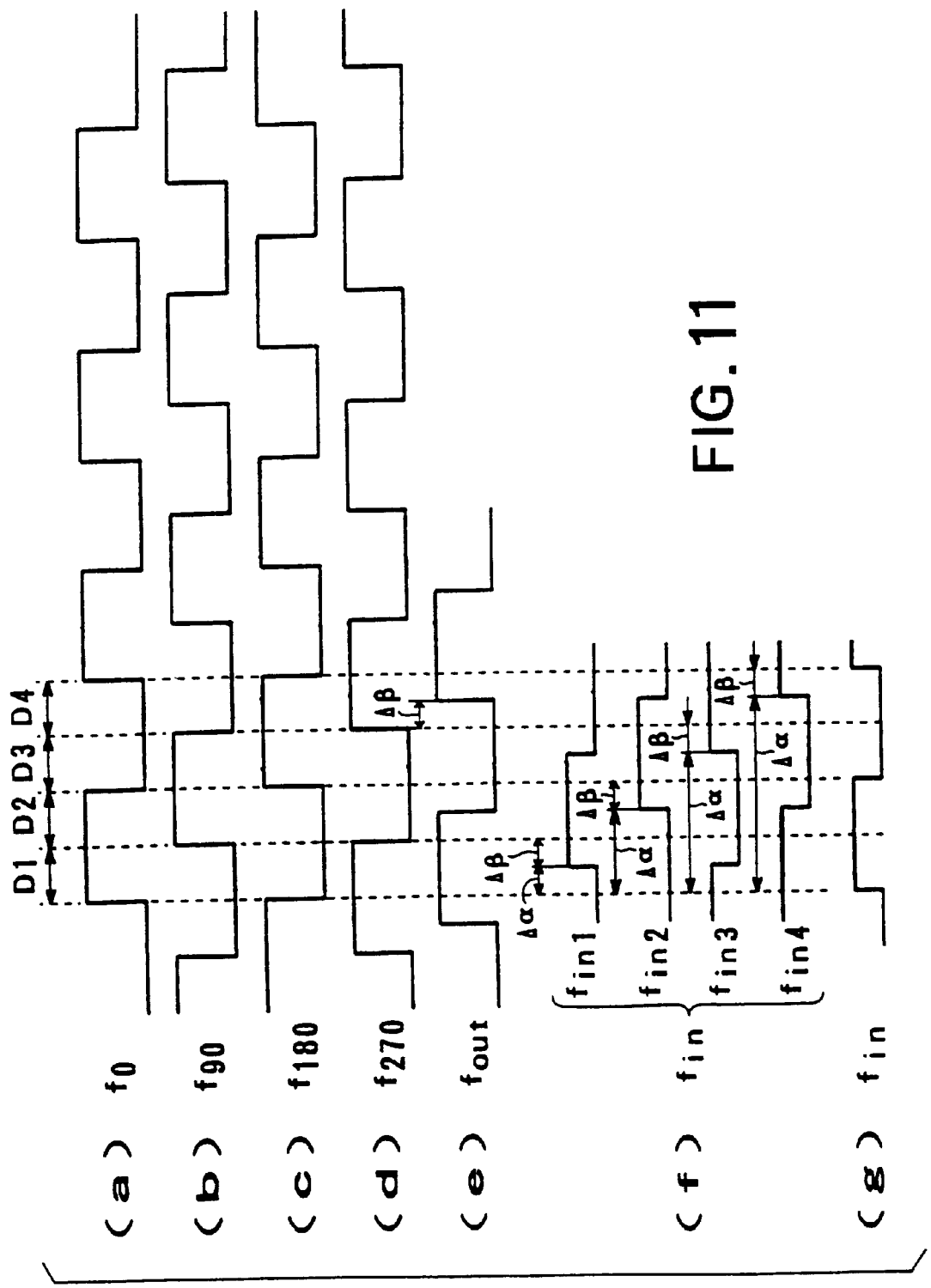
FIGS. 11(a) through 11(g) are waveform charts for explaining the operation of the fourth preferred embodiment of a semiconductor integrated circuit device according to the present invention.

Referring to FIGS. 9 through 11, the fourth preferred embodiment of a semiconductor integrated circuit device according to the present invention will be described below. FIG. 9 is a block diagram of the fourth preferred embodiment of a semiconductor integrated circuit device according to the present invention, and FIG. 10 is a block diagram illustrating the construction of a DLL circuit for use in the semiconductor integrated circuit device in the fourth preferred embodiment. FIGS. 11(a) through 11(g) are waveform charts for explaining the operation of the fourth preferred embodiment of a semiconductor integrated circuit device according to the present invention.

In a semiconductor integrated circuit device 1 of the fourth preferred embodiment, the PLL circuit 2 of the semiconductor integrated circuit device in the second preferred embodiment shown in FIG. 5 is replaced with a PLL circuit 2A, and the DLL circuit 5 of each of the functional blocks 3$i$ (i=a, b, c, d) is replaced with a DLL circuit 5A. In addition, no short-circuit is established between the ends of the functional blocks 3$a$, 3$b$, 3$c$ and 3$d$.

The PLL circuit 2A produces a reference clock signal $f_0$ and a shift clock signal $f_{90}$, which is delayed from the reference clock signal $f_0$ by a phase of 90 degrees, on the basis of a clock signal $f_1$ transmitted from the outside, and supplies the produced signals to the respective functional blocks 3$i$ (i=a, b, c, d).

As shown in FIG. 10, the DLL circuit 5A comprises inverter gates 81 and 82, a switch circuit 84, a phase comparator 86 and a programmable delay circuit 88.

The inverter gate 81 inverts the reference clock signal $f_0$, and supplies the inverted clock signal, i.e., a shift clock signal $f_{180}$ delayed from the reference clock signal $f_0$ by a phase of 180 degrees, to the switch circuit 84. The inverter gate 82 inverts the clock signal $f_{90}$, and supplies the inverted clock signal, i.e., a shift clock signal $f_{270}$ delayed from the reference clock signal $f_0$ by a phase of 270 degrees, to the switch circuit 84. Therefore, the clock signals $f_0$, $f_{90}$, $f_{180}$ and $f_{270}$ shown in FIGS. 11($a$) through 11($d$) are supplied to the switch circuit 84.

The phase comparator 86 compares the phase of a clock signal $f_{in}$, which is the output of a clock tree 7, with the phases of the reference clock signal $f_0$ and the shift clock signals $f_{90}$, $f_{180}$ and $f_{270}$, and detects a phase lag $\Delta\alpha$ of the clock signal $f_{in}$ delayed from the reference clock signal $f_0$. When the phase lag $\Delta\alpha$ is in the range of 0 (degree)<$\Delta\alpha$≦90 (degrees) (in the range of D1 shown in FIG. 11) (e.g., when the clock signal $f_{in}$ is $f_{in1}$ shown in FIG. 11($f$)), a command signal for selecting the shift clock signal $f_{270}$ is transmitted to the switch circuit 84. When the phase lag $\Delta\alpha$ is in the range of 90<$\Delta\alpha$≦180 (in the range of D2 shown in FIG. 11) (e.g., when the clock signal $f_{in}$ is $f_{in2}$ shown in FIG. 11($f$)), a command signal for selecting the shift clock signal $f_{180}$ is transmitted to the switch circuit 84. When the phase lag $\Delta\alpha$ is in the range of 180<$\Delta\alpha$270 (in the range of D3 shown in FIG. 11) (e.g., when the clock signal $f_{in}$ is $f_{in3}$ shown in FIG. 11($f$)), a command signal for selecting the shift clock signal $f_{90}$ is transmitted to the switch circuit 84. When the phase lag $\Delta\alpha$ is in the range of 270<$\Delta\alpha$ ≦360 (in the range of D4 shown in FIG. 11) (e.g., when the clock signal $f_{in}$ is $f_{in4}$ shown in FIG. 11($f$), a command signal for selecting the shift clock signal $f_0$ is transmitted to the switch circuit 84.

The switch circuit 84 selects one of the four clock signals $f_0$, $f_{90}$, $f_{180}$ and $f_{270}$ on the basis of the command signal transmitted from the phase shifter 86, and switches the connection so as to allow the selected signal to be supplied to the programmable delay circuit 88. For example, when the switch circuit 84 receives the command signal for selecting the shift clock signal $f_{180}$ from the phase comparator 86, the switch circuit 84 selects the shift clock signal $f_{180}$ to switch the connection so as to allow the shift clock signal $f_{180}$ to be supplied to the programmable delay circuit 88.

The programmable delay circuit 88 delays a clock signal supplied from the switch circuit 84, by a predetermined lag $\Delta\alpha$ based on the phase lag $\Delta\alpha$ of the clock signal $f_{in}$, which is delayed from the reference clock signal $f_0$ and which is detected by the phase comparator 86. The lag $\Delta\alpha$ has the following values.

(1) where 0<$\Delta\alpha$≦90, $\Delta\beta$=90−$\Delta\alpha$
(2) where 90<$\Delta\alpha$≦180, $\Delta\beta$=180−$\Delta\alpha$
(3) where 180<$\Delta\alpha$≦270, $\Delta\beta$=270−$\Delta\beta$
(4) where 270<$\Delta\alpha$≦360, $\Delta\beta$=360−$\Delta\beta$ Therefore, a clock signal $f_{out}$ supplied from the programmable delay circuit 88 to the clock tree 7 is delayed by the lag $\Delta\beta$ from the clock signal supplied from the switch circuit 84 to the programmable delay circuit 88.

Thus, when the clock signal $f_{out}$ passes through the clock tree 7, the output signal of the clock tree 7 is a clock signal delayed from the reference clock signal $f_0$ by one cycle (see FIG. 11($g$)). The reason for this is as follows. For example, assuming that the phase lag $\Delta\alpha$ of the clock signal $f_{in}$ is in the range of 0<$\Delta\alpha$≦90, the shift clock signal $f_{270}$ is supplied from the switch circuit 84 to the programmable delay circuit 88. Thus, the clock signal $f_{out}$ (see FIG. 11($e$)) delayed from the shift clock signal $f_{270}$ by $\Delta\beta$(=90−$\Delta\alpha$) is supplied to the clock tree 7. Since the clock signal $f_{out}$ is delayed by $\Delta\alpha$ after passing through the clock tree 7, the clock signal outputted from the clock tree 7 is delayed from the reference clock signal $f_0$ by 360 degrees (=270+$\Delta\beta$+$\Delta\alpha$).

As described above, the semiconductor integrated circuit device in the fourth preferred embodiment has the same advantages as those in the second preferred embodiment.

In the fourth preferred embodiment, the phase lag $\Delta\beta$ adjusted by the programmable delay circuit 88 is in the range of 0<$\Delta\beta$<90. On the other hand, the phase lag $\Delta\beta$ adjusted by the variable delay line 21 of the DLL circuit 5 (see FIG. 2) in the first through third preferred embodiments is in the range of 0≦$\Delta\beta$<360.

Thus, even if the programmable delay circuit 88 of the DLL circuit 5A for use in the fourth preferred embodiment comprises delay elements shown in FIG. 4A or 4B similar to the first preferred embodiment, the size of the programmable delay circuit 88 can be about a fourth of the variable delay line 21 of the DLL circuit 5, so that the area of a chip occupied by the DLL circuit 5A can be decreased.

Furthermore, in the fourth preferred embodiment, the phase lag $\Delta\alpha$ detected by the phase comparator 86 can be obtained by detecting the leading edges of the clock signal $f_{in}$ and the reference clock $f_0$.

In the fourth preferred embodiment, while the clock signals supplied from the PLL circuit 2A to each of the DLL circuits 5A have been the clock signals $f_0$ and $f_{90}$, the clock signals $f_{180}$ and $f_{270}$ may be supplied from the PLL circuit 2A to each of the DLL circuits 5A. In this case, it is not required to provide the inverter gates 81 and 82 in the DLL circuits 5A. Alternatively, three or more clock signals phase-shifted from the reference clock signal $f_0$ may be supplied from the PLL circuit 2A to each of the DLL circuits 5A.

Figure 12:
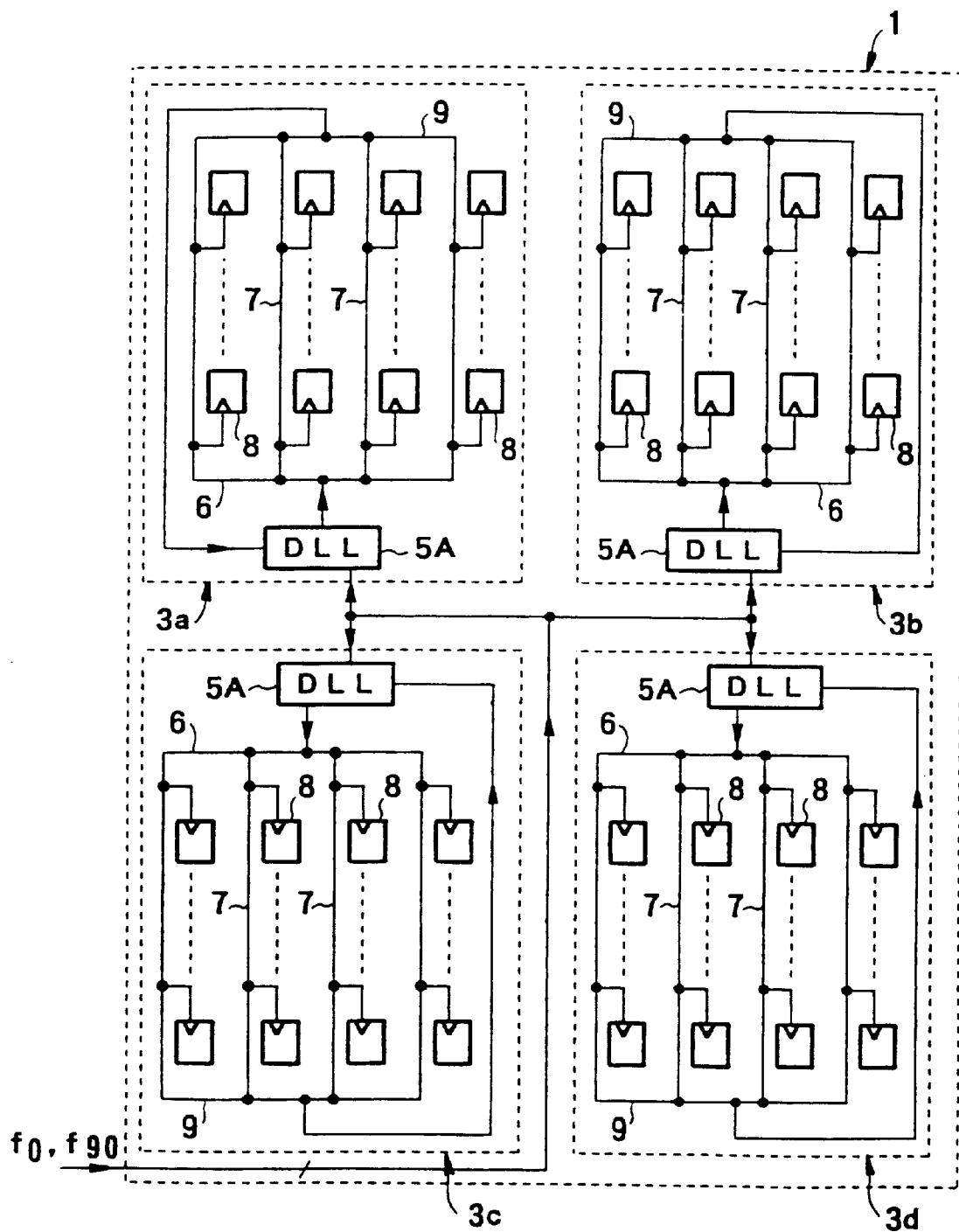
FIG. 12 is a block diagram of the fifth preferred embodiment of a semiconductor integrated circuit device according to the present invention.

In addition, the DLL circuit 5A in the fourth preferred embodiment may be substituted for the DLL circuit 5 in the first preferred embodiment. In this case, as shown in FIG. 12, a reference clock signal $f_0$ and a clock signal $f_{90}$ phase-shifted from the reference clock signal $f_0$ by 90 degrees are supplied from the outside of a semiconductor integrated circuit device 1 to each of DLL circuits 5A.

As described above, according to the present invention, it is possible to prevent clock skew from occurring even if there are variation due to process and so forth.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A semiconductor integrated circuit device comprising:
   a plurality of functional blocks, each comprising:
   a DLL circuit for outputting a first clock signal;
   at least one wiring portion, one end of which is connected to an output end of said DLL circuit for allowing said first clock signal to pass therethrough; and
   at least one load circuit for receiving said first clock signal from said DLL circuit via said wiring portion,
   wherein said DLL circuit receives a reference clock signal and a second clock signal outputted from the other end of said wiring portion and outputs said first clock signal so that a phase difference between the reference clock signal and the second clock signal is a predetermined value.

2. A semiconductor integrated circuit device as set forth in claim 1, wherein at least one functional block of said plurality of functional blocks has a plurality of wiring portions, each of which is said wiring portion, each of said wiring portions being provided with at least one load circuit corresponding to each of said wiring portions, one end of each of said plurality of wiring portions being short-circuited to receive an output of said DLL circuit, and the other end of each of said plurality of wiring portions being short-circuited to be connected to an input end of said DLL circuit, to which said second clock signal is inputted.

3. A semiconductor integrated circuit device as set forth in claim 2, wherein the other end of each of said wiring portions of said plurality of functional blocks is short-circuited, and which further comprises a PLL circuit for producing said reference clock signal on the basis of said second clock signal transmitted from the short-circuit end and a clock signal transmitted from the outside, to transmit said reference clock signal to said DLL circuit of each of said plurality of functional blocks.

4. A semiconductor integrated circuit device as set forth in claim 3, wherein said DLL circuit comprises:
   a delay circuit for producing a plurality of delay signals, which have different lags from said reference clock signal, on the basis of said reference clock signal;
   a phase comparator circuit for comparing a phase of said reference clock signal with a phase of said second clock signal transmitted from the other end of said wiring portion, to output a control signal for causing a phase difference of a predetermined value; and
   means for selecting one delay signal from said plurality of delay signals on the basis of said control signal to output the selected delay signal to said wiring portion.

5. A semiconductor integrated circuit device as set forth in claim 4, wherein said delay circuit has a series circuit comprising a plurality of serially-connected delay elements.

6. A semiconductor integrated circuit device as set forth in claim 4, wherein said delay circuit has a plurality of series circuits, each of which comprises a plurality of serially-connected delay elements, said plurality of series circuits being connected to each other in parallel, each of said plurality of series circuits having different lags.

7. A semiconductor integrated circuit device as set forth in claim 1, wherein the other end of each of said wiring portions of said plurality of functional blocks is short-circuited, and which further comprises a PLL circuit for producing said reference clock signal on the basis of said second clock signal transmitted from the short-circuit end and a clock signal transmitted from the outside, to transmit said reference clock signal to said DILL circuit of each of said plurality of functional blocks.

8. A semiconductor integrated circuit device as set forth in claim 7, wherein said DLL circuit comprises:
   a delay circuit for producing a plurality of delay signals, which have different lags from said reference clock signal, on the basis of said reference clock signal;
   a phase comparator circuit for comparing a phase of said reference clock signal with a phase of said second clock signal transmitted from the other end of said wiring portion, to output a control signal for causing a phase difference of a predetermined value; and
   means for selecting one delay signal from said plurality of delay signals on the basis of said control signal to output the selected delay signal to said wiring portion.

9. A semiconductor integrated circuit device as set forth in claim 1, wherein said DLL circuit comprises:
   a delay circuit for producing a plurality of delay signals, which have different lags from said reference clock signal, on the basis of said reference clock signal;
   a phase comparator circuit for comparing a phase of said reference clock signal with a phase of said second clock signal transmitted from the other end of said wiring portion, to output a control signal for causing a phase difference of a predetermined value; and
   means for selecting one delay signal from said plurality of delay signals on the basis of said control signal to output the selected delay signal to said wiring portion.

10. A semiconductor integrated circuit device comprising:
    a plurality of functional blocks, each comprising:
    a DLL circuit for receiving a reference clock signal and at least one shift clock signal phase-shifted from said reference clock signal, to output a first clock signal;
    at least one wiring portion, one end of which is connected to an output end of said DLL circuit for allowing said first clock signal to pass therethrough; and
    at least one load circuit for receiving said first clock signal from said DLL circuit via said wiring portion,
    wherein said DLL circuit receives a reference clock signal and a second clock signal outputted from the other end of said wiring portion and outputs said first clock signal so that a phase difference between the reference clock signal and the second clock signal is a predetermined value.

11. A semiconductor integrated circuit device as set forth in claim 10, wherein at least one functional block of said plurality of functional blocks has a plurality of wiring portions, each of which is said wiring portion, each of said wiring portions being provided with at least one load circuit corresponding to each of said wiring portions, one end of each of said plurality of wiring portions being short-circuited to receive an output of said DLL circuit, and the other end of each of said plurality of wiring portions being short-circuited to be connected to an input end of said DLL circuit, to which said second clock signal is inputted.

12. A semiconductor integrated circuit device as set forth in claim 11, which further comprises a PLL circuit for producing said reference clock signal and said shift clock signal on the basis of a clock signal transmitted from the outside, to transmit said reference clock signal and said shift clock signal to said DLL circuit of each of said plurality of functional blocks.

13. A semiconductor integrated circuit device as set forth in claim 11, wherein said shift clock signal is a first shift clock signal delayed from said reference clock signal by a phase of 90 degrees, and wherein said DLL circuit comprises:

shift clock producing means for producing a second shift clock signal delayed from said reference clock signal by a phase of 180 degree and a third shift clock signal delayed from said first shift clock signal by a phase of 180 degree, on the basis of said reference clock signal and said first shift clock signal;

a selecting circuit for selecting one clock signal from said reference clock signal and said first through third shift clock signals on the basis of a command signal, to output the selected clock signal;

a phase comparator circuit for comparing a phase of a second clock signal outputted from the other end of said wiring portion with a phase of said reference clock signal, to detect a phase lag of said second clock signal from said reference clock signal to transmit said command signal to said selecting circuit on the basis of said phase lag; and a delay circuit for applying a lag, which corresponds to said phase lag detected by said phase comparator circuit, to said clock signal outputted from said selecting circuit and for outputting the resulting clock signal to said wiring portion.

14. A semiconductor integrated circuit device as set forth in claim 10, which further comprises a PLL circuit for producing said reference clock signal and said shift clock signal on the basis of a clock signal transmitted from the outside, to transmit the produced signals to said DLL circuit of each of said plurality of functional blocks.

15. A semiconductor integrated circuit device as set forth in claim 10, wherein said shift clock signal is a first shift clock signal delay ed from said reference clock signal by a phase of 90 degrees, and wherein said DLL circuit comprises:

shift clock producing means for producing a second shift clock signal delayed from said reference clock signal by a phase of 180 degree and a third shift clock signal delayed from said first shift clock signal by a phase of 180 degree, on the basis of said reference clock signal and said first shift clock signal;

a selecting circuit for selecting one clock signal from said reference clock signal and said first through third shift clock signals on the basis of a command signal, to output the selected clock signal;

a phase comparator circuit for comparing a phase of a second clock signal outputted from the other end of said wiring portion with a phase of said reference clock signal, to detect a phase lag of said second clock signal from said reference clock signal to transmit said command signal to said selecting circuit on the basis of said phase lag; and a delay circuit for applying a lag, which corresponds to said phase lag detected by said phase comparator circuit, to said clock signal outputted from said selecting circuit and for outputting the resulting clock signal to said wiring portion.

* * * * *